UNITED STATES PATENT OFFICE.

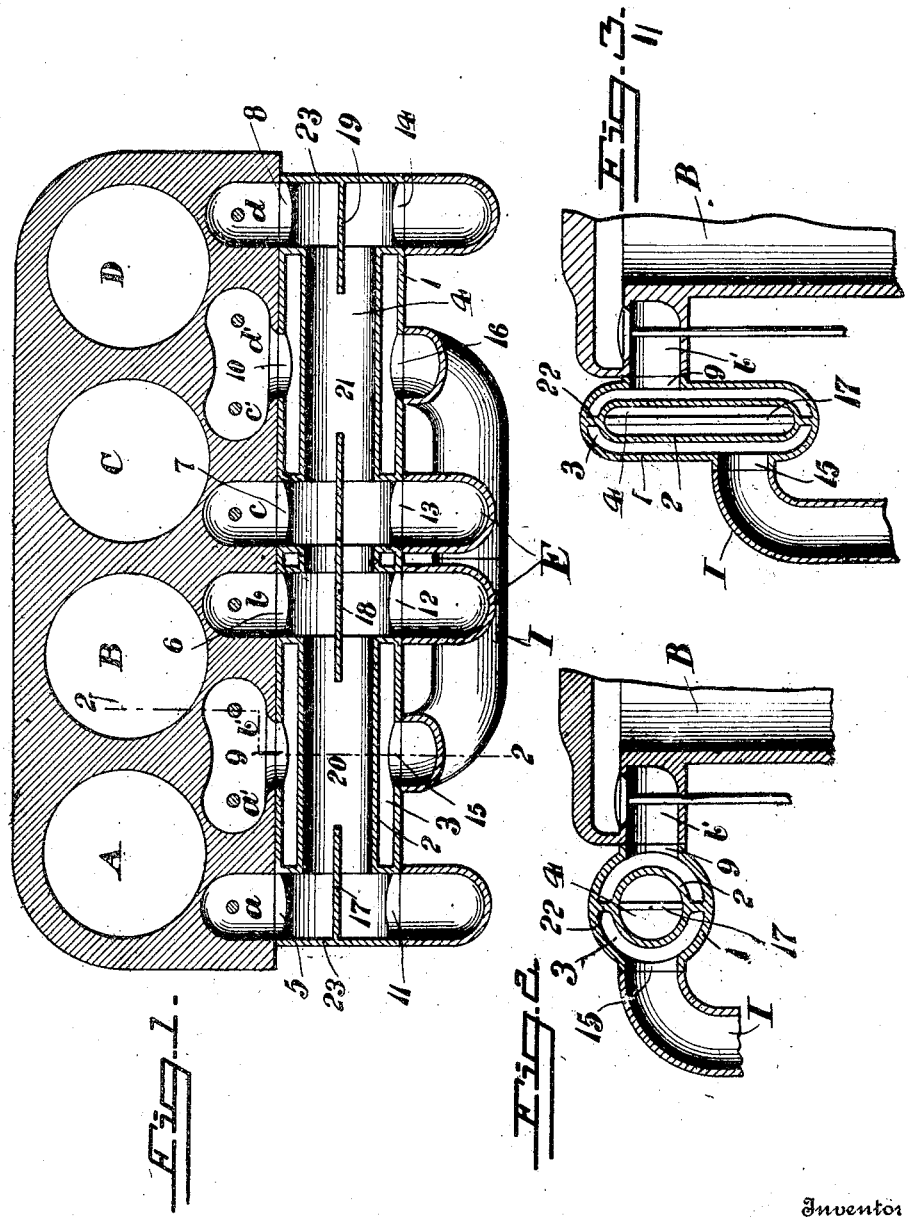

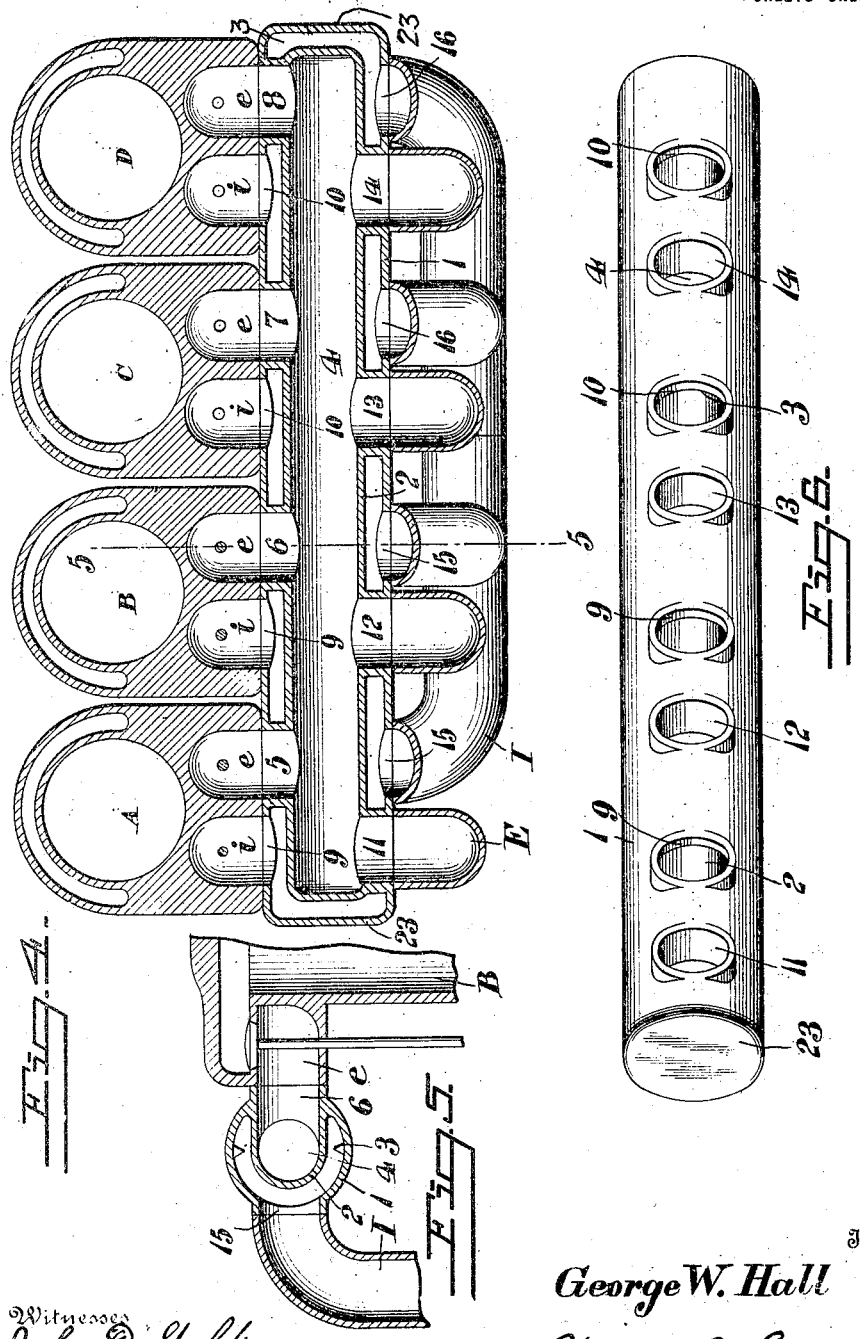

GEORGE W. HALL, OF ASBURY PARK, NEW JERSEY.

MANIFOLD.

1,200,608.

Specification of Letters Patent.

Patented Oct. 10, 1916.

Application filed February 2, 1916. Serial No. 75,810.

*To all whom it may concern:*

Be it known that I, GEORGE W. HALL, a citizen of the United States, residing at Asbury Park, in the county of Monmouth and State of New Jersey, have invented new and useful Improvements in Manifolds, of which the following is a specification.

This invention relates to manifolds, being especially designed for use in connection with the ordinary exhaust and intake manifolds of an internal combustion engine, the auxiliary manifold of this invention being adapted to be interposed between the present manifolds and the body of the engine, the object in view being to thoroughly heat the incoming mixture and efficiently vaporize the same so that better combustion results, and also a material economy in the consumption of the liquid fuel.

With the above and other objects in view, the invention consists in the novel construction, combination and arrangement of parts, as herein described, illustrated and claimed.

In the accompanying drawings:—Figure 1 is a horizontal longitudinal section through the auxiliary manifold of this invention showing the relation of the same to the usual intake and exhaust manifolds and the body of the engine. Fig. 2 is a section on the line 2—2 of Fig. 1. Fig. 3 is a section on the same line as Fig. 2 but showing a modified shape of auxiliary manifold. Fig. 4 is a plan view similar to Fig. 1 showing the adaptation of the auxiliary manifold to an engine of different design. Fig. 5 is a section on the line 5—5 of Fig. 4. Fig. 6 is a detached perspective view of the auxiliary manifold.

The manifold contemplated in this invention comprises an outer shell 1 and an inner shell 2, the said shells being arranged in spaced relation to each other so as to leave an intervening arcuate chamber 3, the inner shell 2 forming a contained chamber 4.

In the preferred embodiment of the invention, the auxiliary manifold is cylindrical in shape and of a length sufficient to extend throughout nearly the entire length of the engine so as to take in all of the inlet and exhaust ports of the engine as clearly indicated in Figs. 1 and 4.

Under the arrangement shown in Fig. 1 in which the engine comprises the cylinders A, B, C and D, the exhaust port $a$ for the cylinder A and the exhaust port $b$ for the cylinder B are arranged at a considerable distance apart while the inlet port $a'$ of the cylinder A and the inlet $b'$ of the cylinder B are arranged close together and between the exhaust ports $a$ and $b$. The same arrangement prevails with regard to the exhaust ports $c$ and $d$ of the cylinders C and D and the inlet ports $c'$ and $d'$ of the last named cylinders. In such case the auxiliary manifold is provided with the exhaust ports 5, 6, 7 and 8 which correspond and register with the ports $a$, $b$, $c$, and $d$ and is provided with the additional inlet ports 9 and 10 through which the explosive mixture passes to the inlet ports $a'$, $b'$, $c'$ and $d'$. At its opposite side the auxiliary manifold is provided with the exhaust ports 11, 12, 13 and 14 which register with the corresponding ports of the usual exhaust manifold E and is further provided with the inlet ports 15 and 16 which correspond with the similar ports of the intake manifold I.

The auxiliary manifold is applied to the engine by first removing the usual intake and exhaust manifolds and substituting the auxiliary manifold therefor. After the auxiliary manifold has been placed in position, the usual intake and exhaust manifolds are then connected to the auxiliary manifold and perform their usual function in the same way as previously. The important difference, however, resides in the fact that the incoming mixture is forced to pass through the chamber 3 of the auxiliary manifold before reaching the combustion chambers of the engine and therefore the fresh mixture is thoroughly heated by the shell 2 which carries off the exhaust or burned gases from the engine.

Extending longitudinally within the inner shell 2 are baffle walls 17, 18 and 19, all of said walls being in line with each other but terminating in such manner as to leave spaces at 20 and 21 allowing the burned gases to pass outwardly from the body of the engine through the inner shell 2 and into the exhaust manifold E. Ordinarily it is preferred to extend the baffle walls 17, 18 and 19 also to the outer shell to form strengthening webs or bridges 22 which are not, however, continuous as this would interfere with the free movement of the incoming mixture. The auxiliary manifold is closed at both ends by the end wall 23.

Where there is a limited amount of space under the engine hood, instead of employing the form or shape of auxiliary manifold illustrated in Fig. 2, for example, the form or shape illustrated in Fig. 3 may be employed, the shells 1 and 2 providing, however, for the same area and capacity but being of less dimension horizontally and of greater dimension vertically.

In other designs of engines, one of which is illustrated in Fig. 4, the intake ports $i$ and the exhaust ports $c$ of the engine are arranged alternately to each other there being an exhaust port between each pair of intake ports and an intake port between each pair of exhaust ports. In such case the ports of the auxiliary manifold will be located accordingly so that the exhaust gases from the engine will be discharged into the inner shell 2 while the fresh gas is admitted to the outer shell 1 and circulates around the inner shell where it is heated in the same manner as heretofore explained and for the same purpose. In all other respects the manifold illustrated in Figs. 4 to 6 inclusive is identical with that illustrated in Figs. 1 to 3 inclusive.

From the foregoing description, taken in connection with the accompanying drawings it will now be clear that the incoming mixture by passing through the auxiliary manifold is thoroughly heated and is therefore in far better condition for combustion when it enters the cylinders of the engine. Not only this but the full value of the fuel oil or liquid is obtained and a proportionate economy in the consumption of fuel is the result. One of the chief advantages of the invention resides in the fact that the auxiliary manifold may be readily combined with engines already in use, it being only necessary to disconnect the usual intake and exhaust manifolds and interpose the auxiliary manifold between the body of the engine and the usual intake and exhaust manifolds, the latter then being reapplied so that they communicate directly with the auxiliary manifold in place of the body of the engine.

It will, of course, be understood that the manifold is susceptible of changes in the form, proportion and minor details so as to adapt the same to engines of different sizes, H. P. and design, and I therefore reserve the right to make such changes as properly fall within the scope of the appended claims.

Having thus described my invention, I claim:—

1. The combination with an internal combustion engine, and the intake manifold and exhaust manifold thereof, of an auxiliary manifold interposed between the engine and the first named manifolds and embodying an outer shell in communication with one of the first named manifolds, and an inner shell in communication with the other of the first named manifolds.

2. The combination with an internal combustion engine, and the intake manifold and exhaust manifold thereof, of an auxiliary manifold interposed between the engine and the first named manifolds and embodying an outer shell in communication with one of the first named manifolds, and an inner shell in communication with the other of the first named manifolds, said auxiliary manifold being closed at both ends.

3. The combination with an internal combustion engine, and the intake manifold and exhaust manifold thereof, of an auxiliary manifold interposed between the engine and the first named manifolds and embodying an outer shell in communication with one of the first named manifolds, an inner shell in communication with the other of the first named manifolds, and baffle walls extending longitudinally of and within said inner shell.

4. The combination with an internal combustion engine, and the intake manifold and exhaust manifold thereof, of an auxiliary manifold interposed between the engine and the first named manifolds and embodying an outer shell in communication with one of the first named manifolds, and an inner shell in communication with the other of the first named manifolds, said auxiliary manifold having the same number of exhaust and inlet ports as the engine.

In testimony whereof I affix my signature in presence of two witnesses.

GEORGE W. HALL.

Witnesses:
 FRANK D. HALL,
 WILLIAM F. DOLAN.